(12) United States Patent
Valentine

(10) Patent No.: US 6,758,101 B2
(45) Date of Patent: Jul. 6, 2004

(54) STEAM TO CARBON RATIO CONTROL IN STEAM REFORMING OF HYDROCARBONS

(75) Inventor: Julie Ann Valentine, Reno, NV (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 09/873,716

(22) Filed: Jun. 4, 2001

(65) Prior Publication Data

US 2002/0178806 A1 Dec. 5, 2002

(51) Int. Cl.[7] .............................................. G01F 1/84
(52) U.S. Cl. .................... 73/861.356; 73/195
(58) Field of Search .... 73/195, 198, 861.354–861.357, 73/861.351, 861.04, 32 A, 19.03, 61.45

(56) References Cited

U.S. PATENT DOCUMENTS

| | | | |
|---|---|---|---|
| 4,757,709 A | * | 7/1988 | Czernichow ................. 73/155 |
| 5,029,482 A | | 7/1991 | Liu et al. |
| 5,190,726 A | | 3/1993 | Shinoki et al. |
| 5,259,239 A | * | 11/1993 | Gaisford ..................... 73/61.44 |
| 5,458,808 A | * | 10/1995 | Suggitt et al. ............... 252/373 |
| 6,221,280 B1 | | 4/2001 | Anumakonda et al. |
| 6,327,914 B1 | * | 12/2001 | Dutton ................... 73/861.356 |

FOREIGN PATENT DOCUMENTS

| | | |
|---|---|---|
| EP | 1 213 566 A2 | 6/2002 |
| JP | 10120401 | 5/1998 |

OTHER PUBLICATIONS

D. L. King and C. E. Bochow, Jr., What Should an Owner/Operator Know When Choosing an SMR/PSA plant?, Hydrocarbon Processing, (May 2000), 8 page(s).
Lukas, M.D. et al., "Performance Implications of Rapid Load Changes in Carbonate Fuel Cell Systems," 2001 IEEE Power Engineering Society Winter Meeting. Conference Proceedings, Jan. 28–Feb. 1, 2001, pp. 979–984, vol. 3 of 3, New York, New York.

* cited by examiner

Primary Examiner—Harshad Patel
(74) Attorney, Agent, or Firm—Duft Setter Ollila & Bornsen LLC

(57) ABSTRACT

A mass flowmeter system for use in steam reformation of hydrocarbons includes a Coriolis flowmeter in a hydrocarbon feedstock line. The feedstock carbon content is estimated by close approximation, which facilitates selective control operations governing the relative amounts of steam and hydrocarbon materials as they feed a hydrogen processing unit. The relative amounts of steam and hydrocarbon feedstock are adjusted on the basis of real time measurements.

20 Claims, 4 Drawing Sheets

STEAM TO CARBON RATIO CONTROL IN STEAM REFORMING OF HYDROCARBONS

FIELD OF INVENTION

This invention relates to methods and apparatus for improving process efficiency of the steam reforming of hydrocarbons (SRH) method of hydrogen gas production. More particularly, the process improvements use a Coriolis flowmeter to control the steam to carbon ratio in SRH hydrogen gas production.

PROBLEM

Hydrogen is an increasingly valuable commodity having many uses, such as coolant in electrical equipment, fuel for space exploration, and in chemical manufacturing of commercially important products, especially ammonia, methanol, oxo alcohols and hydroformed gasoline. Hydrogen demand is increasing due to regulatory requirements that spur the development of better performing and cleaner fuels.

The primary method of producing hydrogen in commercial quantities is steam reforming of hydrocarbons (SRH). The process may be performed on hydrocarbon gasses or low-octane petroleum fractions under process conditions that typically involve high heat and pressure. Where the reformation process is performed without a catalyst, it is generally known in the art as thermoforming. SRH is most efficient when a catalyst, such as nickel, molybdenum or platinum, facilitates the reaction. A low sulfur hydrocarbon feedstock is needed to avoid poisoning the catalyst. SRH is well known in the art and is described in a variety of publications, such as R. N. Shreve, *Shreve's Chemical Process Industries*, McGraw-Hill, Inc., pp. 106–109 (1984); and D. M. Considine, *Chemical and Process Technology Encyclopedia*, McGraw-Hill, Inc., pp. 592–596 (1974), which are hereby incorporated by reference to the same extent as though their content is fully repeated herein.

Hydrogen gas production by the SRH method involves reacting a hydrocarbon feedstock with steam. In general, hydrocarbon feedstocks contain a variety of hydrocarbons, and the reaction chemistry proceeds according to ideal stoichiometric equations for each type of hydrocarbon. A variety of different reactions occur, depending upon the feedstock. The most important reactions can be generally categorized as:

A. Dehydrogenation of cyclohexanes to yield aromatic hydrocarbons;

B. Dehydrogenation of certain paraffins to yield aromatics;

C. Isomerization including the conversion of straight-chain to branched chain carbon structures, such as octane to isooctane;

D. Reformation of methane in natural gas to produce carbon dioxide and hydrogen; and E. Reformation of naptha to yield synthetic natural gas.

A preferred manner of generating large quantities of hydrogen is to use a natural gas feedstock that contains a large portion of methane. The reaction proceeds as shown in Equation 1:

$$CH_4 + H_2O \Rightarrow CO + 3H_2, \tag{1}$$

where $H_2O$ is preferably present as steam.
This class of reaction similarly operates on other gas fractions in the feedstock for complete decomposition, in an ideal sense, of the hydrocarbon into carbon dioxide and hydrogen. For example, a further reaction including propane ($C_3H_8$) in the hydrocarbon feedstock proceeds according to Equation (2):

$$C_3H_8 + 3H_2O \Rightarrow 3CO + 7H_2, \tag{2}$$

where $H_2O$ is preferably present as steam.

More generally, this overall class of reaction proceeds as shown in Equation (3):

$$C_nH_m + nH_2O \Rightarrow nCO + (m/2+n)H_2 \tag{3}$$

The foregoing equations predict the reaction of lighter hydrocarbons, especially, methane, butane and propane, as well as some liquids, such as naptha. Heavier ends tend to react differently and, while some proceed according to the above Equation (3), other such reactions as isomerization occur, also with resultant hydrogen production.

The equations demonstrate a concept that different amounts of steam are required to complete the reaction, depending upon the feedstock composition. For example, one mole of methane requires one mole of steam in Equation (1), whereas one mole of propane consumes three moles of steam in Equation (2). In commercial manufacturing facilities that operate upon feedstocks of various compositions, these differences impose a potentially significant materials balance problem. The process may be further complicated by using oxygen as a reagent, which results in lower steam consumption.

A wide range of feedstocks can be utilized as the hydrocarbon feedstock in a SRH hydrogen production unit. Hydrocarbons such as natural gas, methane, propane, butane and naphtha can be used as the hydrocarbon feedstock, either alone or in combination. Economics and the availability of particular hydrocarbon feedstocks may dictate the use of different hydrocarbon feedstocks from one period to another.

A particular problem arises in petroleum refineries because the SRH feedstock composition constantly changes. The hydrocarbon feedstock for a hydrogen production unit can come from several sources within the refinery, and these sources contribute different hydrocarbons. One particular example of a combined-source hydrocarbon includes the refinery fuel gas system. Numerous process results contribute to the fuel gas system by adding different hydrocarbons, which may be directed in a combined stream to the hydrogen gas production unit. If one of the contributing refinery fuel gas system processes is shut down or changes in terms of output volume, the composition of the fuel gas system output changes. The changes in feedstock composition require corresponding changes in the SRH process conditions, such as heat, pressure and flow rate, in order to optimize process efficiencies and minimize environmental pollution.

It is presently a problem to accurately measure the fractional composition of a hydrocarbon feedstock in a hydrogen production unit. It is a further problem to control the ratio of steam to carbon in a hydrogen production unit based upon the composition of the feedstock. These measurement and control problems reduce SRH process efficiencies while increasing associated environmental pollution problems.

A traditional approach to measuring the hydrocarbon feedstock in a hydrogen gas production unit involves measuring the hydrocarbon feedstock with a volumetric flowmeter. While somewhat useful in addressing the reaction balance problem arising from combined feedstocks, however, volumetric meters are incapable of providing a full measurement solution. When the composition of the hydrocarbon feedstock changes or a substitute hydrocarbon feedstock is used, the amount of carbon contributed to the hydrogen gas production unit can change dramatically within a given unit of volume, as can the required amount of steam to complete the reaction. For example, under identical conditions of temperature and pressure, the amount of steam required to react with a volume of propane is approximately three times greater than the amount of steam required to react with the same volume of methane. The problem is exacerbated by real gas behavior where the lighter gasses tend to have higher compressibility factors.

Another approach to measuring the hydrocarbon feedstock is to determine the composition of the hydrocarbon feedstock with a gas chromatograph. However a gas chromatograph cannot provide real-time composition data for a hydrocarbon feedstock.

It is known to use Coriolis mass flowmeters to measure mass flow and other information with respect to materials flowing through a pipeline as disclosed in U.S. Pat. No. 4,491,025 issued to J. E. Smith, et al., of Jan. 1, 1985 and Re. 31,450 to J. E. Smith of Feb. 11, 1982. These flowmeters typically comprise a flowmeter electronics portion and a flowmeter sensor portion. Flowmeter sensors have one or more flowtubes of a straight or curved configuration. Each flowtube configuration has a set of natural vibration modes, which may be of a simple bending, torsional, radial or coupled type. Each flowtube is driven to oscillate at resonance in one of these natural modes. The natural vibration modes of the vibrating, material filled systems are defined in part by the combined mass of the flowtubes and the material within the flowtubes. Material flows into the flowmeter sensor from a connected pipeline on the inlet side of the flowmeter sensor. The material is then directed through the flowtubes and exits the flowmeter sensor to a pipeline connected on the outlet side of the flowmeter sensor.

When there is no material flowing through a Coriolis flowmeter sensor, all points along the flowtubes oscillate with a substantially identical phase. As material flows through the flowtubes, Coriolis accelerations cause points along the flowtubes to have a different phase. The phase on the inlet side of the flowmeter sensor lags the driver, while the phase on the outlet side of the flowmeter sensor leads the driver.

Coriolis flowmeter sensors typically include two pick-offs for producing sinusoidal signals representative of the motion of the flowtubes at different points along the flowtubes. A phase difference of the sinusoidal signals received from the pick-offs is calculated by the flowmeter electronics. The phase difference between the pick-off signals is proportional to the mass flowrate of the material flowing through the flowmeter sensor.

Coriolis flow measurement systems have not been adapted for use in SRH processes, in part, because they fundamentally measure mass, as opposed to the conventional volumetric systems. Additionally, it has not been understood how mass flow meters could be adapted to measure or estimate the mass attributable to fractional components of the combined feedstocks.

SOLUTION

The above and other problems are solved and an advance in the art is made by adapting Coriolis flowmeters for use measuring the hydrocarbon feedstock of a SRH hydrogen gas production unit. The use of Coriolis mass flowmeters, as described hereinbelow, results in a more accurate, versatile and real-time hydrocarbon feedstock measurement than is permitted by conventional systems. Further, the use of a Coriolis effect mass flowmeter allows for increased control of the carbon to steam ratio in hydrogen gas production.

In general terms, the metering system and method provided in accordance with the present instrumentalities uses a mass flowmeter, such as a Coriolis mass flowmeter, to measure the mass or mass flow rate of the hydrocarbon feedstock delivered to a hydrogen gas production unit. The mass flowrate of the hydrocarbon feedstock is then used to control the steam to carbon ratio in SRH hydrogen gas production.

One such embodiment of a mass flowmeter system comprises a hydrocarbon feedstock supply for supplying a hydrocarbon feedstock to the hydrogen gas production system. A steam supply is used to supply steam to the hydrogen production system. A mass flowmeter is operably connected to the hydrocarbon feedstock supply for measuring a hydrocarbon mass flow rate therein and for producing a hydrocarbon flow rate signal representing the hydrocarbon mass flow rate. A second flowmeter is operably connected to the steam supply for measuring a steam flow rate and for producing a steam flow rate signal representing the steam flow rate. A controller is operable for receiving the hydrocarbon flow rate signal and the steam flow rate signal. The controller has program instructions for controlling a ratio of the hydrocarbon feedstock and the steam delivered to the hydrogen production system.

Preferred embodiments include one or both of the mass flowmeter used in the hydrocarbon supply line and the second flowmeter used in the steam supply line comprising Coriolis mass flowmeters. These instrumentalities may be used to particular advantage where the hydrocarbon feedstock comprises a mixture of hydrocarbon gasses, or hydrocarbons materials having a different composition over a period of time. Overall accuracy of the system is improved by the use of a correlation to determine the carbon content in the hydrocarbon feedstock. Accuracy is further enhanced by measuring a physical parameter of the hydrocarbon feedstock, such as density or gas gravity, to facilitate the correlation.

A method of operating the previously described system includes, for example, measuring a mass flow rate of a hydrocarbon feedstock delivered to the hydrogen production system and provide a hydrocarbon mass flow rate measurement, measuring a second flow rate of steam delivered to the hydrogen production system to provide a steam flow rate measurement, controlling the amount of the hydrocarbon feedstock and the steam delivered to the hydrogen producing system based upon the hydrocarbon mass flow rate measurement and the steam flow rate measurement. The measurements may be made contemporaneously with control operations to adjust the ratio of carbon and steam. The measuring steps may even be repeated in real time while the controller is making adjustments to the respective flow rates.

The metering system and method provided in accordance with the present instrumentalities may utilize a CPU in the form of meter electronics, a controller or any other computational device, which operates on a signal representing the hydrocarbon mass flow measurement and controls a valve or other device capable of modifying the hydrocarbon flow according to the desired carbon to steam ratio. The computational device may also use these signals to control a valve or other device capable of modifying the steam flow according to the desired carbon to steam ratio. The Coriolis mass flowmeter metering system is particularly advantageous when a hydrogen gas production unit readily switches between different types of hydrocarbon feedstocks or receives hydrocarbon feedstocks of modified hydrocarbon composition.

ASPECTS OF THE INVENTION

In accordance with the discussion above, the disclosed instrumentalities have the following object, aspects, and advantages.

It is an aspect of the invention to adapt a mass flowmeter for use in SRH processes.

It is a further aspect of the invention to obtain the benefit of accuracy inherent to Coriolis flowmeter systems and apply the same to SRH processes.

BRIEF DESCRIPTION OF THE DRAWINGS

The above and other advantages of this invention may be more readily understood upon a reading of the Detailed Description in conjunction with the following drawings.

DETAILED DESCRIPTION

Figure 1:
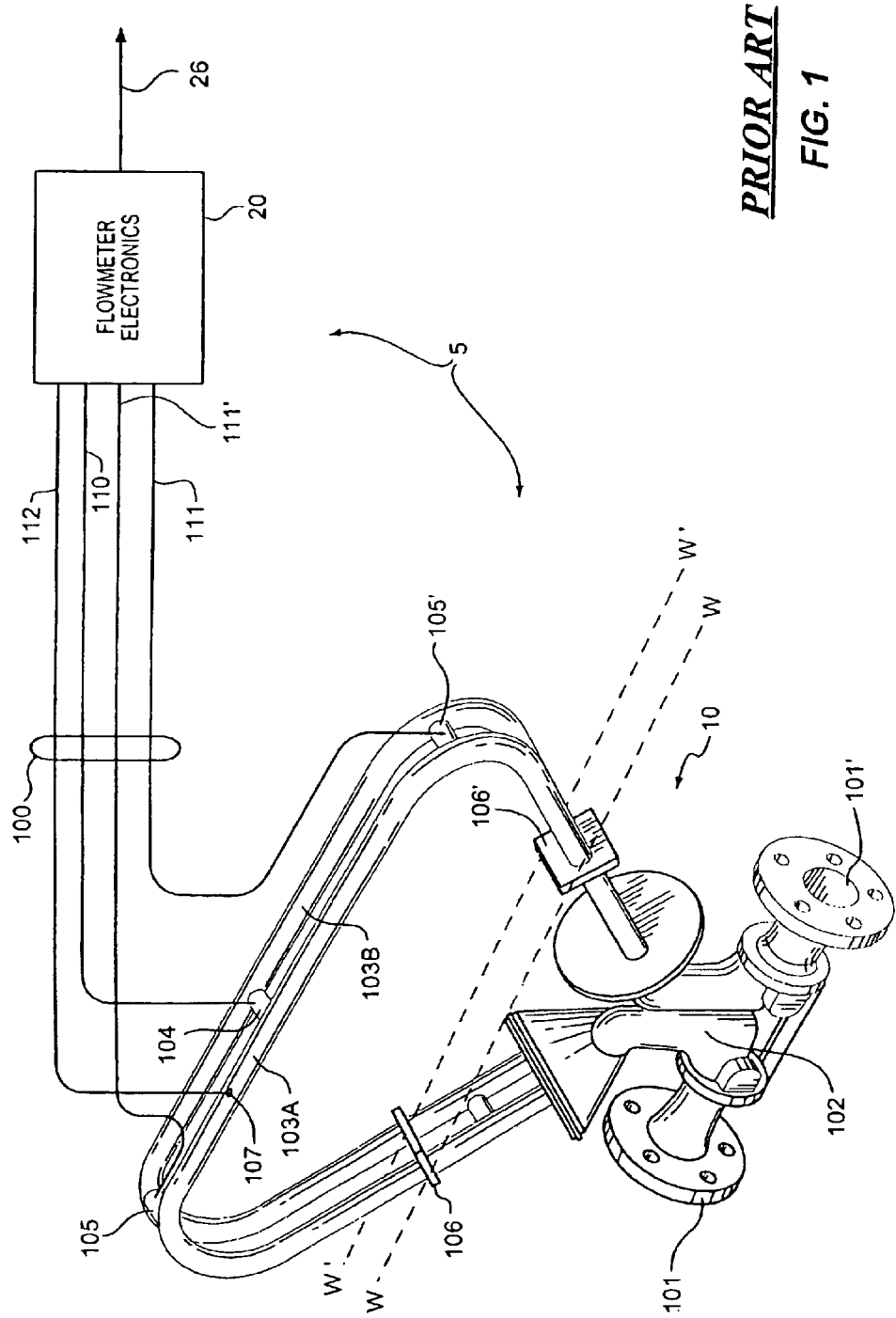
FIG. 1 illustrates a Coriolis flowmeter sensor and electronics.

Preferred embodiments of the present invention will now be described more fully hereinafter with reference to the accompanying drawings. Those skilled in the art will appreciate that the invention may be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

FIG. 1 shows an exemplary Coriolis flowmeter 5 comprising a Coriolis flowmeter sensor 10 and a Coriolis flowmeter electronics 20. Flowmeter electronics 20 are connected to flowmeter sensor 10 via path 100 to provide for example, but not limited to, density, mass flow rate, volume flow rate and totalized mass flow information over path 26. A variety of commercially available Coriolis flowmeters providing these measurements may be purchased, for example, from Micro Motion of Boulder, Colo.

Flowmeter sensor 10 includes a pair of flanges 101 and 101', manifold 102 and flowtubes 103A and 103B. Connected to flowtubes 103A and 103B are driver 104 and pick-off sensors 105 and 105', and temperature sensor 107. Brace bars 106 and 106' serve to define the axis W and W' about which each flowtube oscillates.

When flowmeter sensor 10 is inserted into a pipeline system (not shown in FIG. 1) which carries the process material that is being measured, material enters flowmeter sensor 10 through flange 101, passes through manifold 102 where the material is directed to enter flowtubes 103A and 103B, flows through flowtubes 103A and 103B and back into manifold 102 from where it exits flowmeter sensor 10 through flange 101'.

Flowtubes 103A and 103B are selected and appropriately mounted to the manifold 102 so as to have substantially the same mass distribution, moments of inertia and elastic modules about bending axes W—W and W'—W', respectively. The flowtubes 103A–103B extend outwardly from the manifold in an essentially parallel fashion.

Flowtubes 103A–103B are driven by driver 104 in opposite directions about their respective bending axes W and W' and at what is termed the first out of phase bending mode of the flowmeter. Driver 104 may comprise any one of many well known arrangements, such as a magnet mounted to flowtube 103A and an opposing coil mounted to flowtube 103B and through which an alternating current is passed for vibrating both flowtubes. A suitable drive signal is applied by flowmeter electronics 20, via lead 110, to driver 104.

Pick-off sensors 105 and 105' are affixed to at least one of flowtubes 103A and 103B on opposing ends of the flowtube to measure oscillation of the flowtubes. As flowtubes 103A–103B vibrate, pick-off sensors 105–105' generate a first and a second pick-off signal. The first and second pick-off signals are applied to leads 111 and 111'.

Temperature sensor 107 is affixed to at least one of flowtubes 103A and 103B. Temperature sensor 107 measures the temperature of the flowtube in order to modify equations for the temperature of the system. Path 112 carries temperature signals from temperature sensor 107 to flowmeter electronics 20.

Flowmeter electronics 20 receive the first and second pick-off signals appearing on leads 111 and 111', respectively. Flowmeter electronics 20 processes the first and second pick-off signals to compute the mass flow rate, the density, or other property of the material passing through flowmeter sensor 10. This computed information is applied by meter electronics 20 over path 26 to a utilization means (not shown in FIG. 1).

In accordance with presently preferred instrumentalities for use of the foregoing Coriolis flowmeter 5, there will now be shown a mass flowmeter system for use in controlling a reformation reaction in a hydrogen production system. The system includes a hydrocarbon feedstock supply for supplying a hydrocarbon feedstock to the hydrogen production system. A steam supply is similarly used for steam supply for supplying steam to the hydrogen production system. A mass flowmeter is operably connected to the hydrocarbon feedstock supply for measuring a hydrocarbon mass flow rate of the hydrocarbon feedstock, as the hydrocarbon feedstock is supplied to the hydrogen production system. The mass flow meter is operable for producing a hydrocarbon flow rate signal representing the hydrocarbon mass flow rate. A second flowmeter is operably connected to the steam supply for measuring a steam flow rate and is operable for producing a steam flow rate signal representing the steam flow rate. A controller is operable for receiving data including the hydrocarbon flow rate signal and the steam flow rate signal. Program instructions operate on this data to control a ratio of the hydrocarbon feedstock and the steam delivered to the hydrogen production system.

Figure 2:
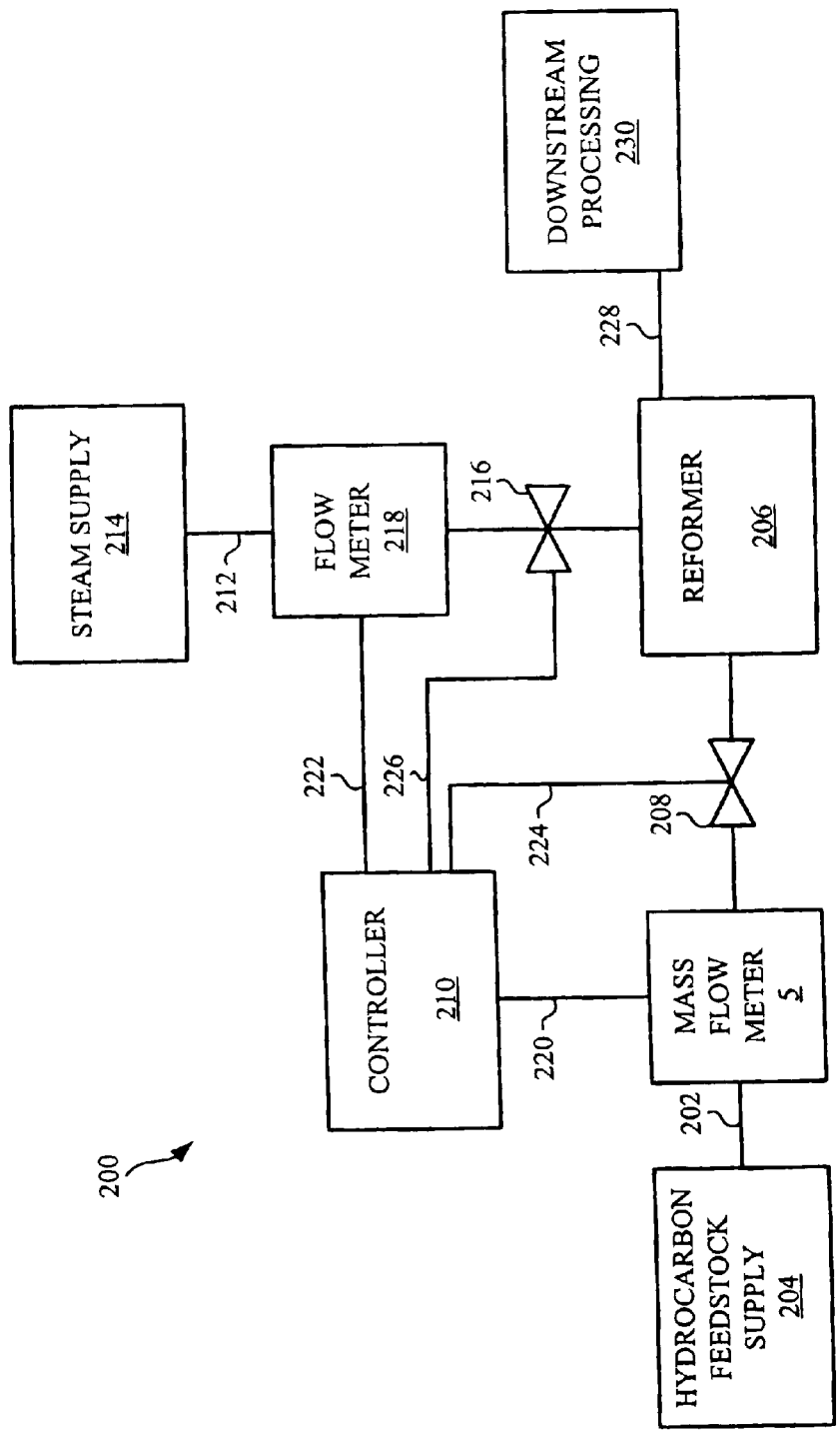
FIG. 2 illustrates a Coriolis flowmeter system providing a preferred embodiment using a Coriolis flowmeter to control controlling the carbon to steam ratio in a hydrogen production systems using a hydrocarbon feedstock.

FIG. 2 is a schematic diagram representing flow metering system 200. A Coriolis effect mass flowmeter 5 is installed in line 202 connecting hydrocarbon feedstock source 204 with reformer 206. The Coriolis effect mass flowmeter 5 performs real time measurements on materials flowing through line 202, and produces signals representing these measurements. These measurements preferably but optionally include mass flow rate, mass totalization, temperature, pressure, and density. As used hereinafter, the terms "mass flow rate measurement" and "flow rate measurement," unless specified otherwise, are defined to include actual flow rate measurements, as well as any measurements or calculations that derive from flow rate measurements. Thus, for example, a calculation of volumetric flow rate derived by dividing a mass flow rate by density would also be a mass flow rate within the scope of this definition, as would a mass totalization derived by integrating mass flow rate over time. The hydrocarbon feedstock supply 204 contains any hydrocarbon or combination of hydrocarbons that that can be subjected to reformation processing in the reformer 206. The reformer 206 is preferably a conventional hydrogen processing unit or system of the type that operates on natural gas or a refinery fuel line to generate hydrogen gas by the reactions shown in Equations (1)–(4). The reformer 206 may also be a catalytic cracker, naptha-base gas synthesizer or any other system that uses steam reformation to generate hydrogen byproducts. Valve 208 is installed in line 202 to regulate flow through line 202 as directed by an automated system controller 210.

Line 212 connects the reformer 206 with a steam supply 214, which may include, for example, a boiler or mixed vapor product of upstream processing. Valve 216 in line 212 regulates flow through line 212 as directed by the automated system controller 210. A second flowmeter 218 is installed in line 212 to measure the steam flow rate in line 212. The second flowmeter 218 is preferably a second Coriolis effect mass flowmeter or a mass vortex flowmeter, but may also be a volumetric or positive displacement flowmeter where the steam supply is not a mixed vapor byproduct or a two-phase mixture of steam and water.

The system 200 contains data transmission lines that facilitate the operations of controller 210. Data line 220 is used to transmit signals between controller 210 and the corresponding mass flow meter 5. Data line 222 is used to transmit signals between controller 210 and the corresponding mass flow meter 218. Data line 224 is used to transmit signals between controller 210 and the corresponding valve 208 for selective actuation of the valve 208 under the direction of controller 210 for purposes of selectively controlling the flow rate in line 202. Data line 226 is used to transmit signals between controller 210 and the corresponding valve 216 for selective actuation of the valve 216 under the direction of controller 210 for purposes of selectively controlling the flow rate in line 212. These data lines may optionally be replaced by a radio or optical system.

Controller 210 is generally any computational device, such as a CPU, associated memory, and data storage, that may be programmed to convert the mass flow rate measurements from mass flowmeter 5 into the appropriate carbon to steam ratio. Controller 210 is also programmed to control the flow rate of steam and/or hydrocarbon in order to control the steam to carbon ratio arriving at reformer 206. This control may be asserted by selectively adjusting one or both of valves 208 and 216 to optimize reaction conditions within reformer 206 on demand in a real-time data context where the flow meters 5 and 218 are measuring flow rates contemporaneously with action by controller 210.

The contents of reformer 206 exit through pathway 228 towards downstream processing equipment 230. Pathway 228 may include a plurality of material transfer lines or pipes, for example, leading to conventional downstream processing equipment 230 that includes, for example, a CO converter using an iron oxide catalyst to form $CO_2$ with associated additional hydrogen. The gas flow stream may, for example, also be cooled, scrubbed, fractionated, or stored according to any known means.

The depiction of FIG. 2 is intended to illustrate preferred embodiments of the invention and, consequently, are not intended to limit the invention. For example, the meter electronics 20 may be integrated with controller 210 and vice-versa, or processing functions may be reallocated among the respective components. The system components of the flow pathway in lines 202 and 212, e.g., flowmeter 5 and valve 208, may be arranged in any sequential order.

An especially preferred feature of the invention is the use of the flowmetering system 200 where the hydrocarbon feedstock input to reformer 206 from hydrocarbon feedstock source 204 varies or includes multiple constituents. In petroleum refineries, the hydrocarbon feedstock for a hydrogen production unit can come from several sources within the refinery contributing different hydrocarbons in one combined stream or in sequential streams of essentially homologous composition. An example of a hydrocarbon feedstock in a petroleum refinery is the refinery fuel gas system. The refinery fuel gas system is contributed to by numerous processes adding different hydrocarbons to the hydrocarbon feedstock of the hydrogen gas production unit. If one of the contributing refinery fuel gas system processes is shut down, the composition of the fuel gas system output changes. Controller 210 is capable of computing the correct steam to carbon ratio as the carbon content of the hydrocarbon feedstock changes. The method of operating system 200 includes a variety of methods for calculating and applying this ratio, as described below.

There will now be shown and described, according to presently preferred practices, a method of operating a mass flowmeter for use in steam reformation of hydrocarbons processing where a hydrogen production system is in use. The method comprising the steps of measuring a mass flow rate of a hydrocarbon feedstock to provide a hydrocarbon mass flow rate measurement, measuring a second flow rate of steam to provide a steam flow rate measurement, and controlling the amounts of the hydrocarbon feedstock and the steam delivered to the hydrogen producing system based upon the hydrocarbon mass flow rate measurement and the steam flow rate measurement. This method is performed using, for example, a system of the type shown in FIG. 2.

Figure 3:
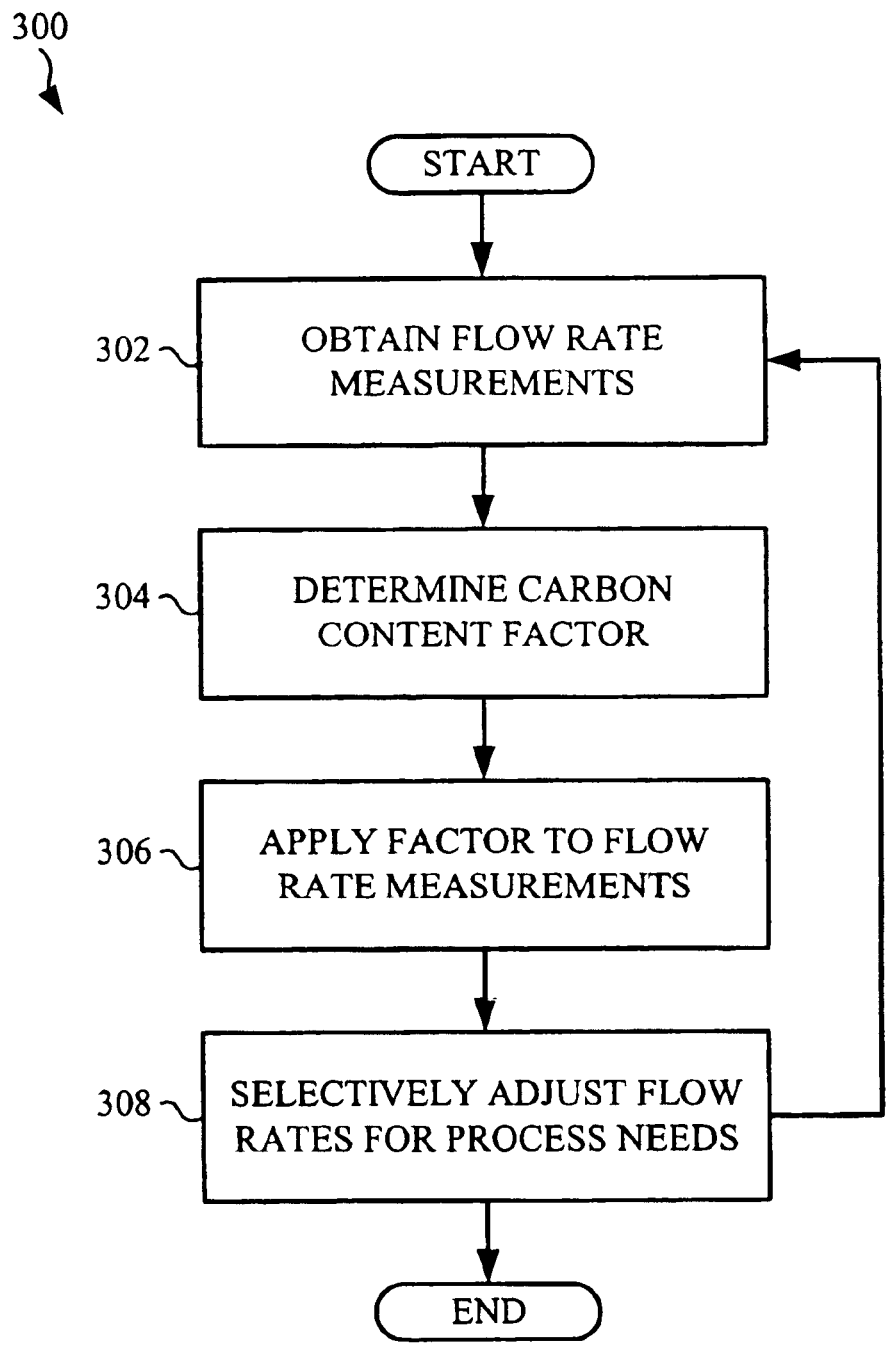
FIG. 3 is a schematic diagram of process control instructions for use in a controller governing operation of the system shown in FIG. 2.

As indicated above, the method of operation may be implemented by programming a controller, such as controller 210, with instructions that embody the method. FIG. 3 diagrams a process 300 representing these program instructions. In step 302, the controller obtains flow rate measurements for the respective hydrocarbon feedstock and the steam supply. Next, in step 304, the controller determines a carbon content factor, which is used in approximating the carbon content of the hydrocarbon feedstock by applying the carbon content factor to the hydrocarbon mass flow rate measurement in step 306. Also in step 306, a ratio of the carbon content to steam content is calculated. The ratio is used to selectively adjust the hydrocarbon and/or steam flow rates to accommodate process needs. Various aspects of these method steps are discussed below in additional detail.

The main problem addressed by use of a Coriolis mass flowmeter to measure the mass flow rate of the hydrocarbon feedstock is that of feedstocks having various compositions. For example, a common hydrocarbon feedstock used in SRH hydrogen production is natural gas. Natural gas is typically a mixture of alkanes including methane, ethane, propane, butane and pentane, with a small representation of heavier fractions. Alkane hydrocarbons have the general formula $C_nH_{2n+2}$. Because alkanes conform to the general formula, the amount of carbon contributed by a natural gas feedstock is roughly identifiable from the mass of the natural gas feedstock, independent of the proportion of the contributing gasses. The atomic mass of carbon is approximately 12 and the atomic mass of hydrogen is approximately 1. Based on the general formula, a given mass of natural gas will be approximately 75% carbon, e.g., 100 kg of natural gas translates into 75 kg of carbon and 25 kg of hydrogen. Thus, the determination of a carbon content factor in step 304 may include the use of a constant, such as 0.75. The 0.75 factor is precise for methane and a very good approximation of feedstocks comprised primarily of methane, where the molecular weight of methane is 16 g/mole of which 12 g/mole is carbon. On the other hand, the fraction for ethane is 0.80. For propane and butane, it is 0.82 and 0.83, respectively.

Figure 4:
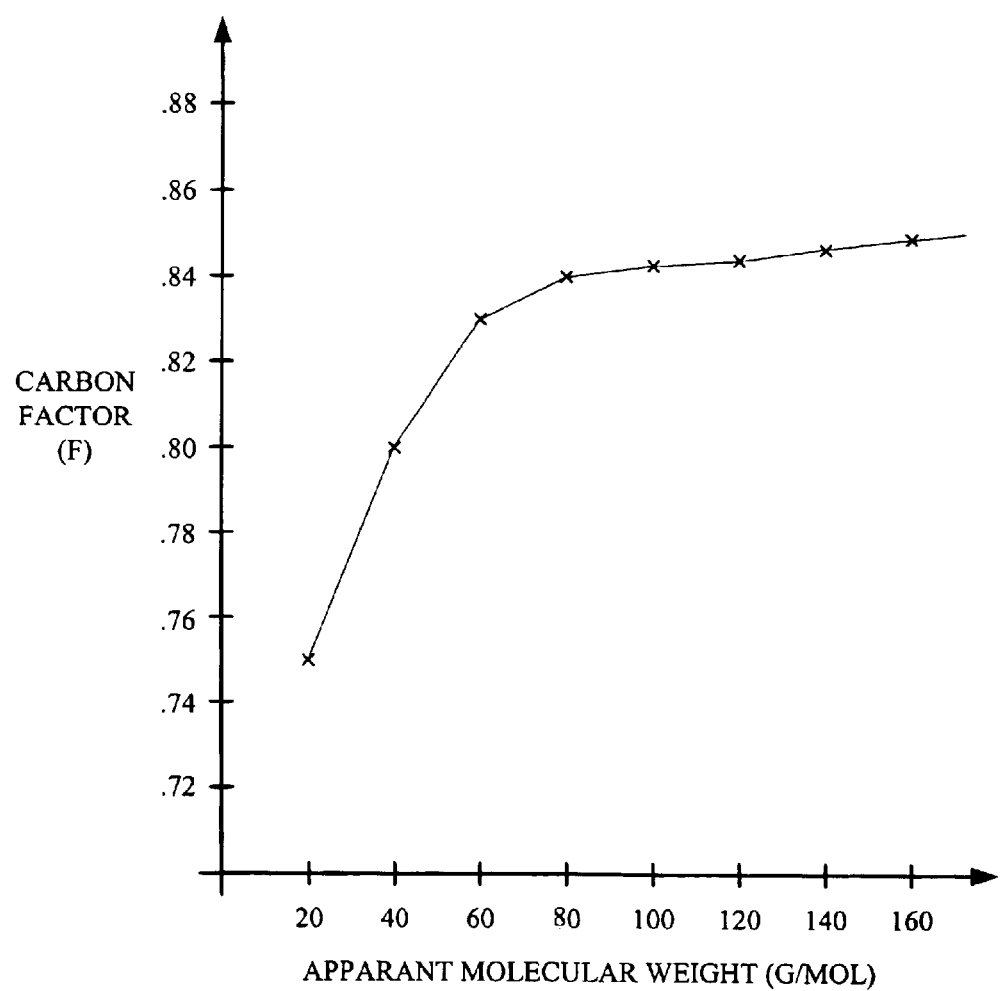
FIG. 4 provides a correlation relating a carbon content factor to average molecular weight of a hydrocarbon feedstock.

FIG. 4 presents the dimensionless factor F as a function of molecular weight, as determined for the alkane fractions $C_1$ through $C_{10}$. The values in FIG. 4 demonstrate that F approximates 0.85 for the heavier fractions and ranges from 0.75 to 0.85. An F value of 0.85 should suffice for most hydrocarbon liquids. For gasses, correlations like the one shown in FIG. 4 may be reproduced using empirical sampling of actual feedstocks to obtain a slightly more accurate value for F.

In equation form, the number of moles of carbon in any hydrocarbon flowstream may be approximated by the relationship:

$$nC = \int_{t_1}^{t_2} F(t) * \left[\frac{M_f(t)}{M_c}\right] dt \quad (4)$$

where nC is the number of moles of carbon, F(t) is the carbon content factor which may vary as a function of time, $M_f(t)$ is the mass flow rate which may vary as a function of time, $M_c$ is the molecular weight of carbon, and t is time.

By way of contrast to mass flow metering technologies, as the proportion of constituent gasses of natural gas feedstock changes, the amount of carbon contributed by the natural gas feedstock changes relative to volume. A standard cubic meter of butane contains considerably more carbon than a standard cubic meter of methane. However as illustrated above, as the proportion of constituent gasses of natural gas feedstock changes, the amount of carbon contributed by the natural gas remains essentially constant relative to mass of the natural gas feedstock.

Another problem with volumetric measurements arises from real gas behavior. A variety of equations of state are used to predict the compressibility of gasses, such as Van der Waal's equation and the real gas law. The real-gas law, for example, is:

$$PV = ZnRT, \quad (5)$$

where P is pressure, V is volume, n is the number of moles of gas, Z is the gas compressibility factor, R is the gas-law constant, and T is absolute temperature.

Equation (5) may be adapted to calculate the average molecular weight of a combined flowstream as $$M_{wfs} = \frac{\rho ZRT}{P} \quad (6)$$

where $M_{wfs}$ is the average molecular weight of the combined gas flow stream, $\rho$ is density, and the remaining values are defined in context of Equation (5). This value of $M_{wfs}$ may be used to enter FIG. 4, or a similar correlation, and obtain a value for F.

A measured density value may be obtained, for example, by using the Coriolis flowmeter 5 as a vibrating tube densitometer. The density measurements thus obtained may not be sufficiently accurate under conditions of low pressure, depending upon the design of the meter so employed. Thus, supplemental density measurements may be obtained in line 202 (See FIG. 2), for example, by additional instruments, such as a gamma ray densitometer or any other instrument or empirical correlation that is capable of providing gas density measurements.

The value for Z is preferably calculated using a conventional empirical correlation for this purpose, such as those published by Brown et al, "Natural Gasoline and the Volatile Hydrocarbons," Natural Gas Assn. of America, Tulsa (1948) or Wichert and Aziz, "Compressibility Factors for Sour Natural Gasses," Cdn. J. Chem Eng. (1972) 49, 269–75, which relate pseudoreduced temperature and pressure to the value for Z. Changes in the value of Z with time will likely be negligible over the range of most process conditions and feedstocks.

Naphtha is also a commonly used hydrocarbon feedstock in SRH hydrogen production. Naphtha is typically a mixture of alkane hydrocarbons and non-alkane hydrocarbons. Non-alkane hydrocarbons include alkenes and alkynes. The presence of double and triple bonds in these hydrocarbons may have a minor influence in raising the value of the F factor. For example, a pure alkene having a single double bond might have an F value of 0.86, whereas an alkyne of the same length could have an F value of 0.96. Knowledge of the variability of the proportions of alkanes and non-alkanes associated with the naphtha feedstock allows the amount of carbon contributed by the feedstock to be readily estimated.

Another method of calculating the F value in step 304 is to train a conventional neural network or other adaptive model by, for example, inputing measured process conditions or results from the downstream processing operations 230 (see FIG. 2) together with flow measurement information form the mass flowmeter 5 and the flow meter 218, as well as other measurements including process temperature and pressure in any flow component upstream of material transfer line 228. The network can then be inverted to produce a predictive model in which desired downstream process conditions can be provided as input to arrive at a necessary combination of flow rates governed by controller 210.

Once the amount of hydrocarbon contributed by the hydrocarbon feedstock is known, the corresponding amount of steam can be determined, which is the final portion of step 306. The amount of steam is determined by analogy to Equations (1) to (3), which require one mole of water in the form of steam for each mole of carbon. The number of moles of carbon may be calculated, for example, using Equation (4). The number of moles of steam may be calculated in like manner by substituting the mass flow rate measurement from flow meter 218 for $M_f$ and the molecular weight of water for $M_w$:

$$nW = \int_{t_1}^{t_2} F_w(t) * \left[\frac{M_{fw}(t)}{M_w}\right] dt \quad (7)$$

where nW is the number of moles of water or steam, $F_w(t)$ is the proportion of steam supply 214 that is steam (usually 100%) which may vary with time, $M_{fw}(t)$ is the mass flow rate of the steam supply which may vary with time, $M_w$ is the molecular weight of water, and t is time.

In practice, the carbon to steam ratio is customized in step 308 to account for deviations from the ideal reaction and conventional experience with the related underlying SRH processes. For example, a stoichiometric excess of steam may be preferred to drive hydrogen production according to Equations (1) to (3) towards substantial completion. In other processes, oxygen may be added. Both of these eventualities require corresponding adjustment to the assumption of 1:1 equivalency between molar steam and carbon content.

In the relationship shown as Equations (4) and (7), it may be assumed that F and Fw do not vary with time. In this case, the integrands devolve to accumulated mass over an interval of time multiplied by the various constants. The meter electronics 20 of the Coriolis flowmeters, for example, are sometimes capable of accumulating these totals, which fall under the broad definition of "mass flow rate" used herein because these totals derive from mass flow rate measurements. Furthermore, under these assumptions, a ratio may be calculated without having to integrate, as $$\frac{dnC}{dnW} = \left\{ \frac{F(t_1) * \left[\frac{M_f(t_1)}{M_c}\right]}{F_w(t_1) * \left[\frac{M_{fw}(t_1)}{M_w}\right]} \right\} \quad (8)$$

where $$\frac{dnC}{dnW}$$

is a ratio of carbon to steam molar flow rates over an averaged interval or instant of time $t_1$, $F(t_1)$ is the carbon content factor which is constant over the interval or instant of time $t_1$, $F_w(t_1)$ is the proportion of steam supply 214 that is steam (usually 100%) which is constant over the interval or instant of time $t_1$, the measurements $M_f(t_1)$ $M_{fw}(t_1)$ are determined contemporaneously for the respective hydrocarbon mass flow rate $M_f(t_1)$ and the steam mass flow rate $M_{fw}(t_1)$, and the remaining terms are defined above in regard to Equations (4) and (7).

The automated system controller 210 may apply the forgoing principles and equations to adjust this ratio in step 308 by control of valves 208 and 216 to arrive at new flow rates of the respective hydrocarbon and steam supplies.

Selective adjustment of the relative amounts of carbon and steam, alone, does not meet the need of the overall SRH process. The relative amounts of carbon and steam are preferably adjusted in relative proportion to establish the desired ratio while maintaining sufficient flow through reformer 206 (see FIG. 2), such that reformer 206, in order of priority, operates within design parameter, does not become a choke point for process operations upstream of line 202, does not exceed the supply constraints of materials available for use in line 202, and meets the needs of downstream processing operations 230. Thus, controller 210 is preferably configured to adjust the flow rates and process conditions in the overall system 200 including upstream and downstream process conditions.

Those skilled in the art will understand that the preferred embodiments described above may be subjected to apparent modifications without departing from the true scope and spirit of the invention. The inventors, accordingly, hereby state their intention to rely upon the Doctrine of Equivalents, in order to protect their full rights in the invention.

I claim:

1. A flow metering system for use in controlling a reformation reaction in a hydrogen production system, said flow metering system comprising:

a first flowmeter configured to measure a mass flow rate of a hydrocarbon feedstock from a hydrocarbon feedstock supply and to produce a hydrocarbon flow rate signal representing said mass rate of said hydrocarbon feedstock;

a second flowmeter configured to measure a flow rate of steam from a steam supply and to produce a steam flow rate signal representing said flow rate of said steam; and a controller configured to receive said hydrocarbon flow rate signal and said steam flow rate signal, to receive an estimated carbon content factor, said estimated carbon content factor being based on at least one potential constituent of said hydrocarbon feedstock, to process said mass flow rate of said hydrocarbon feedstock and said estimated carbon content factor to determine an estimated carbon content of said hydrocarbon feedstock, to receive a carbon-to-steam ratio for said hydrogen production system, and to process said estimated carbon content of said hydrocarbon feedstock, said flow rate of said steam, and said carbon-to-steam ratio to control at least one of said flow rate of said steam and said flow rate of said hydrocarbon feedstock.

2. The flow metering system of claim 1 wherein said estimated carbon content factor is based on a mass of carbon for said at least one potential constituent of said hydrocarbon feedstock.

3. The flow metering system of claim 1 wherein said estimated carbon content factor is based on a mass of carbon for said at least one potential constituent in relation to a total mass of said at least one potential constituent.

4. The flow metering system of claim 1 wherein said controller is configured to:

select said estimated carbon content factor from a range of carbon content factors for said hydrocarbon feedstock.

5. The flow metering system of claim 1 wherein said estimated carbon content factor comprises a predetermined constant value for said at least one potential constituent of said hydrocarbon feedstock.

6. The flow metering system of claim 1 wherein said controller is configured to:

process measured process conditions to improve the estimate of said estimated carbon content factor.

7. The flow metering system of claim 1 wherein said first flowmeter comprises a Coriolis mass flowmeter.

8. The flow metering system of claim 1 wherein said second flowmeter comprises a Coriolis mass flowmeter.

9. The flow metering system of claim 1 further comprising:

said hydrogen production system that comprises a Steam Reformation of Hydrogen (SRH) system.

10. The flow metering system of claim 1 further comprising:

a first valve coupled to said controller and configured to control flow of said hydrocarbon feedstock responsive to instructions from said controller; and a second valve coupled to said controller and configured to control flow of said steam responsive to instructions from said controller.

11. A method of operating a flow metering system for controlling a reformation reaction in a hydrogen production system, said method comprising the steps of:

measuring a mass flow rate of a hydrocarbon feedstock delivered to said hydrogen production system to provide a hydrocarbon mass flow rate measurement;

measuring a flow rate of steam delivered to said hydrogen production system to provide a steam flow rate measurement;

identifying an estimated carbon content factor, said estimated carbon content factor being based on at least one potential constituent of said hydrocarbon feedstock;

processing said mass flow rate of said hydrocarbon feedstock and said estimated carbon content factor to determine an estimated carbon content of said hydrocarbon feedstock;

identifying a carbon-to-steam ratio for said hydrogen production system; and processing said estimated carbon content of said hydrocarbon feedstock, said flow rate of said steam, and said carbon-to-steam ratio to control at least one of said flow rate of said steam and said flow rate of said hydrocarbon feedstock.

12. The method of claim 11 wherein said estimated carbon content factor is based on a mass of carbon for said at least one potential constituent of said hydrocarbon feedstock.

13. The method of claim 11 wherein said estimated carbon content factor is based on a mass of carbon for said at least one potential constituent in relation to a total mass of said at least one potential constituent.

14. The method of claim 11 wherein the step of identifying an estimated carbon content factor comprises the step of:

selecting said estimated carbon content factor from a range of carbon content factors for said hydrocarbon feedstock.

15. The method of claim 11 wherein said estimated carbon content factor comprises a predetermined constant value for said at least one potential constituent of said hydrocarbon feedstock.

16. The method of claim 11 further comprising the step of:

processing measured process conditions to improve the estimate of said estimated carbon content factor.

17. The method of claim 11 wherein the step of measuring a mass flow rate of a hydrocarbon feedstock comprises the step of:

measuring said mass flow rate of said hydrocarbon feedstock using a Coriolis mass flowmeter.

18. The method of claim 11 wherein the step of measuring a flow rate of steam comprises the step of:

measuring said flow rate of said steam using a Coriolis mass flowmeter.

19. The method of claim 11 wherein said hydrogen production system comprises a Steam Reformation of Hydrogen (SRH) system.

20. The method of claim 11 further comprising:

controlling flow of said hydrocarbon feedstock using a first valve; and controlling flow of said steam using a second valve.

* * * * *

UNITED STATES PATENT AND TRADEMARK OFFICE
CERTIFICATE OF CORRECTION

PATENT NO. : 6,758,101 B2
DATED : July 6, 2004
INVENTOR(S) : Julie Ann Valentine It is certified that error appears in the above-identified patent and that said Letters Patent is hereby corrected as shown below:

Column 10,
Line 1, replace "$M_{wsf}$" with -- $M_{wfs}$ --.

Signed and Sealed this

First Day of February, 2005

JON W. DUDAS
*Director of the United States Patent and Trademark Office*